UNITED STATES PATENT OFFICE.

ERIC BERKELEY HIGGINS, OF WALLASEY, ENGLAND.

CONVERSION OF UNSATURATED INTO SATURATED COMPOUNDS.

1,211,704.  Specification of Letters Patent.  Patented Jan. 9, 1917.

No Drawing.  Application filed April 19, 1913.  Serial No. 762,390.

*To all whom it may concern:*

Be it known that I, ERIC BERKELEY HIGGINS, Ph. D., a subject of the King of Great Britain and Ireland, residing at Wallasey, Cheshire, England, have invented certain new and useful Improvements Relating to the Conversion of Unsaturated into Saturated Compounds, of which the following is a specification.

This invention relates to processes for the conversion of unsaturated into saturated compounds by means of hydrogen in the presence of finely divided metals, such as nickel, or metallic compounds which exercise a catalytic effect.

The invention has for its object to increase or to accelerate catalysis.

According to the invention I employ a volatile organic acid for the purpose. I have found formic acid effective.

The invention is generally applicable to processes for reduction by catalysis and is of special application to the known processes for converting unsaturated fatty acids or their glycerids into saturated compounds.

In carrying the invention into effect formic acid may be used as a liquid or in the state of vapor or in any suitable form. It may be sprayed into the substance to be treated or into the vessel in which the process is conducted or carried into the reaction mass in vapor form in the introduced gas, the object in each case being to insure that catalysis may take place in the presence of the free volatile organic acid.

I am of course aware that it has before been proposed to employ organic metal salts such as formates of copper, iron, nickel or cobalt for the treatment of organic compounds such as fatty acids and their glycerids, by catalysis.

What I claim as my invention and desire to secure by Letters Patent is:—

1. In processes for the hydrogenation of fatty acids and their esters by the use of a hydrogenation catalyst and hydrogen, causing the reaction to take place in the presence of a free volatile organic acid.

2. In processes for the conversion of unsaturated into saturated compounds by the use of a hydrogenation catalyst and hydrogen, causing the reaction to take place in the presence of free formic acid.

In testimony whereof I have hereunto signed my name to this specification in the presence of two subscribing witnesses.

ERIC BERKELEY HIGGINS.

Witnesses:
ALBERT H. LEWIS,
NANCY THOMAS.